Figure 1:
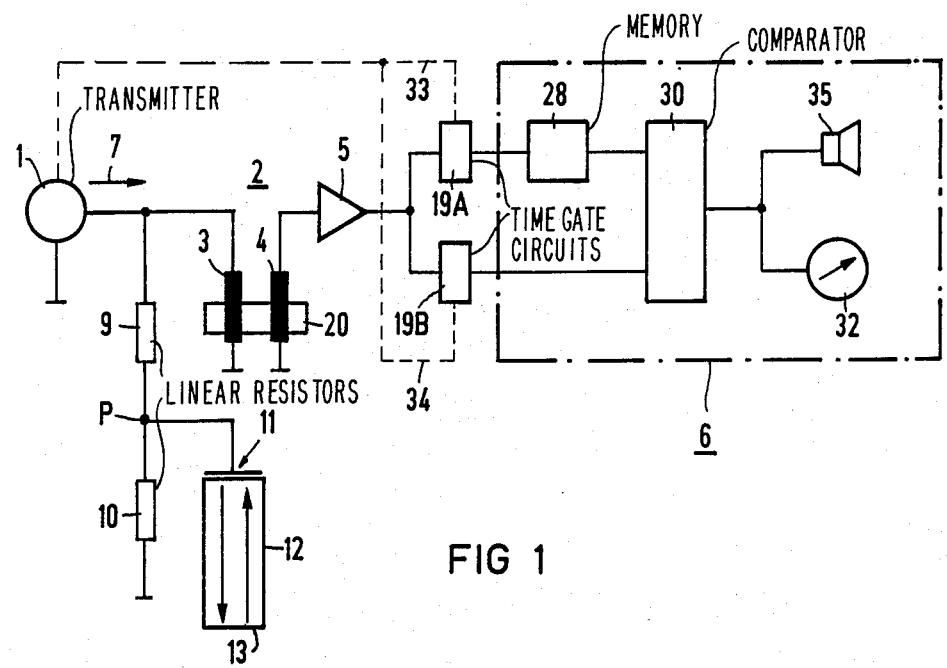

United States Patent [19]

Quittkat et al.

[11] Patent Number: 4,882,539

[45] Date of Patent: Nov. 21, 1989

[54] MONITORING SYSTEM FOR ELECTRODYNAMIC WALL-THICKNESS AND DEFECT TESTING USING A DELAY LINE

[75] Inventors: Joerg Quittkat, Neuberg; Gerhard Thiel, Freigericht, both of Fed. Rep. of Germany

[73] Assignee: Siemens Aktiengesellschaft, Munich, Fed. Rep. of Germany

[21] Appl. No.: 164,575

[22] Filed: Mar. 7, 1988

[30] Foreign Application Priority Data

Mar. 5, 1987 [DE] Fed. Rep. of Germany ....... 3707048

[51] Int. Cl.⁴ .......................... G01B 7/02; G01N 27/82
[52] U.S. Cl. ...................................... 324/229; 324/240; 324/58.5 B
[58] Field of Search ................................ 324/226–229, 324/233, 237–240, 58.5 B; 73/1 DV, 609, 617; 333/150

[56] References Cited

U.S. PATENT DOCUMENTS

| | | | |
|---|---|---|---|
| 3,340,466 | 9/1967 | Ono | 324/227 |
| 4,342,971 | 8/1982 | Councilman et al. | 333/150 X |
| 4,437,332 | 3/1984 | Pittaro | 73/1 DV |

FOREIGN PATENT DOCUMENTS 3327526 10/1986 Fed. Rep. of Germany.
1121767 7/1968 United Kingdom.

OTHER PUBLICATIONS

Technica Nr. 10, 1970, pp. 857–863, 5–1970.
Siemens–Zeitschrift, Jul. 1966, pp. 548–554, 7–1966.
Krautkrämer: Webkstoffprüfung mit Ultraschall, 1980, pp. 146–147 and pp. 153–158, 1980.

Primary Examiner—Reinhard J. Eisenzopf
Assistant Examiner—Jack B. Harvey
Attorney, Agent, or Firm—Herbert L. Lerner; Laurence A. Greenberg

[57] ABSTRACT

A monitoring system monitoring electrical components of an apparatus for electrodynamic wall-thickness and defect testing includes a transmitter generating brief signals. An electrodynamic converter has a transmitter coil connected to the transmitter for receiving the brief signals and feeding the brief signals into a workpiece to be tested in which the brief signals are reflected. The electrodynamic converter has a receiver coil receiving the reflected signals. An amplifier is connected to the receiver coil for receiving the reflected signals and an evaluation unit is connected to the amplifier for receiving the reflected signals. At least one damping element and a delay line are connected to the transmitter for delaying and damping the brief signals. The delay line is coupled through the electrodynamic converter to the evaluation unit for feeding the delayed and damped signals to the transmitter coil.

13 Claims, 1 Drawing Sheet

4,882,539

MONITORING SYSTEM FOR ELECTRODYNAMIC WALL-THICKNESS AND DEFECT TESTING USING A DELAY LINE

The invention relates to a monitoring system for monitoring electrical components in an apparatus for electrodynamic wall-thickness and defect testing, in which a transmitter generates brief signals which can be fed through a transmitter coil of an electrodynamic converter to a workpiece to be tested in which the signals are reflected, and the reflected signals can be supplied to a receiver coil and then through an amplifier to an evaluation unit.

In electrodynamic testing of wall thicknesses and defects, the electrical transmission signal generated by the transmitter is fed through the electrodynamic converter into the workpiece to be tested. This transmission signal has a very high energy. In the workpiece, the signal is reflected, and after conversion into an electrical signal by the converter, it is sent by the converter to the evaluation unit for evaluation. The reflected electrical signal has a very low energy, by comparison with the transmission signal, so that a sensitive amplifier is needed. In order to determine the wall thickness of the workpiece and to recognize defects within the workpiece, the evaluation unit detects both the duration between the appearance of the transmission signal and the reception of the reflected signal, and the amplitude of the reflected signal.

However, neither this duration nor the amplitude of the reflected signal is determined solely by the workpiece to be tested. They are also determined by the parameters of electrical components and supply leads. Any change in these parameters changes both the duration between the appearance of the transmission signal and the reception of the reflected signal and the amplitude of the reflected signal, which in turn leads to inaccurate measurements, since these changes usually go unrecognized.

Theoretically, it might be possible to evaluate the transmission pulse that is supplied through an electrodynamic converter directly from the transmitter coil to the receiver coil, but because of the high energy of the transmission pulse and the high sensitivity of the receiver coil, this cannot be done. Instead, when the transmission pulse appears, the input of the evaluation unit has to be blocked by a time gate circuit, in order to prevent the evaluation unit from being overloaded or even destroyed by this directly transmitted transmission signal.

It is accordingly an object of the invention to provide a monitoring system for electrodynamic wall-thickness and defect testing, which overcomes the hereinafore-mentioned disadvantages of the heretofore-known devices of this general type and which permits changes in component parameters that affect both the duration between the appearance of the transmission signal and the receipt of the reflected signal as well as the amplitude thereof, to be reliably detected.

With the foregoing and other objects in view there is provided, in accordance with the invention, a monitoring system monitoring electrical components of an apparatus for electrodynamic wall-thickness and defect testing, comprising a transmitter generating brief signals, an electrodynamic converter having a transmission coil connected to the transmitter for receiving the brief signals and feeding the brief signals into a workpiece to be tested in which the brief signals are reflected, the electrodynamic converter having a receiver coil receiving the reflected signals, an amplifier connected to the receiver coil for receiving the reflected signals, an evaluation unit connected to the amplifier for receiving the reflected signals, and at least one damping element and a delay line associated therewith being connected to the transmitter for delaying and damping the brief signals, the delay line being coupled through the electrodynamic converter to the evaluation unit for feeding the delayed and damped signals.

In accordance with another feature of the invention, the delay line is an ultrasonic delay line or an electromagnetic delay line.

In accordance with a further feature of the invention, the ultrasonic delay line has at least one piezoelectric or magnetostrictive converter and a sound conductor connected to the converter.

In accordance with an added feature of the invention, the signals in the sound conductor are reflected back to the converter.

In accordance with an additional feature of the invention, the natural frequencies of the piezoelectric or magnetostrictive converter and of the electrodynamic converter are substantially identical.

In accordance with yet another feature of the invention, the at least one damping element includes at least one resistor connected upstream of the delay line.

In accordance with yet a further feature of the invention, there is provided at least one time gate circuit connected to the evaluation unit and opening upon the appearance of the reflected signal and upon the appearance of the delayed signal. One of the time gate circuits may open upon the appearance of the reflected signal and the other of the time gate circuits may open upon the appearance of the delayed signal.

In accordance with a concomitant feature of the invention, there are provided two time gate circuits connected to the evaluation unit, the evaluation unit including a memory, a comparator and a display device.

The delay line specifies a defined duration between the appearance of the transmission signal and the reception of the delayed signal. This duration (or specified set-point time) is unaffected by the workpiece to be tested, but it is affected if time-affecting parameters of components of the monitoring system should change. In the evaluation unit, any deviation of the actual time measured from the specified set-point time is detected and recognized as a defect.

The damping element ensures that the energy of the delayed signal is in the range of the energy of the reflected signals which the evaluation unit normally evaluates. For example, if the energy of the transmission signal deviates from the set-point energy because of an error in the transmitter, then the delayed signal has a correspondingly lesser energy, which is recognized as a defect by the evaluation unit through comparison with the set-point energy of the delayed signal. The energy of the delayed signal is equally unaffected by the workpiece to be tested.

In the evaluation unit, the memory retains a set-point value, the comparator compares an actual value with the set-point value, and the display device is, for example, in the form of an oscillograph.

Other features which are considered as characteristic for the invention are set forth in the appended claims.

Although the invention is illustrated and described herein as embodied in a monitoring system for electrodynamic wall-thickness and defect testing, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

Figure 2:
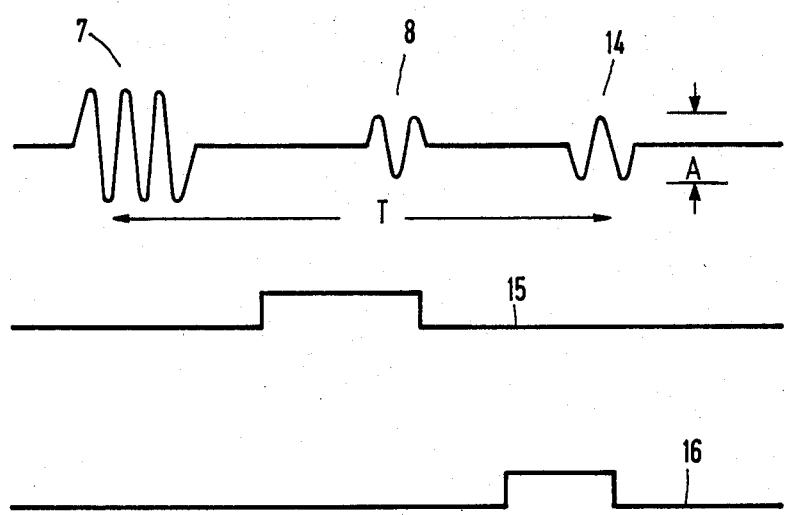

FIG. 1 is a schematic and block circuit diagram of a monitoring system for electrodynamic wall-thickness and defect testing; and FIG. 2 is a timing diagram of the signals that appear when using the system.

Referring now to the figures of the drawings in detail and first, particularly, to FIG. 1 thereof, there is seen a transmitter 1 which is provided in a conventional manner and which has a transmission signal 7 that is supplied to an electrodynamic converter 2. In the illustrated embodiment, the electrodynamic converter 2 is formed of a transmitter coil 3 and a receiver coil 4, which are disposed on a workpiece 20 that is to be tested. It is also possible, however, for only a single coil, serving as both the transmitter and receiver coil, to be provided. The coils 3, 4 are each connected at one end to ground. An evaluation unit 6 is connected to the receiver coil 4 through an amplifier 5 and two time gate circuits 19A and 19B. The time gate circuits 19A and 19B are triggerable from the transmitter 1 through leads 33, 34.

As shown in FIG. 2, the transmitter 2 generates a transmission signal 7, which is in the form of a brief alternating current signal. After conversion of the transmission signal 7 by the transmitter coil 3 and reflection of the converted signal in the workpiece 20 to be tested, the receiver coil 4 converts the reflected signal into an electrical signal 8, which is fed through the amplifier 5 to the evaluation unit 6. Up to this point, the structure and operation of the circuit are known.

A damping element formed of two linear resistors 9, 10 is connected to the output of the transmitter 1. The resistors 9, 10 are connected in series between the output of the transitter 1 and ground. A piezoelectric oscillator 11 is connected to a connection point P between the two resistors 9, 10. The piezoelectric oscillator 11 is disposed on one end of a sound conductor, in particular a Plexiglass rod 12. The piezoelectric oscillator 11 and the Plexiglass rod 12 together form an ultrasonic delay line.

The transmission signal 7 generated by the transmitter 1 is thus supplied not only to the transmitter coil 3, but also through the first resistor 9 to the piezoelectric oscillator 11, which converts it into an ultrasonic signal. The ultrasonic signal is propagated in the Plexiglass rod 12 and is reflected back onto the piezoelectric oscillator 11 at the other end 13 of the rod 12. The ultrasonic signals traveling back and forth are represented by two arrows. In the piezoelectric oscillator 11, the reflected ultrasonic signal is converted back again into an electrical signal, which is damped by the resistors 9, 10 and fed to the transmitter coil 3. From there, the signal is coupled directly to the receiver coil 4 or transformed and supplied to the evaluation unit 6 through the amplifier 5, as a delayed and damped signal 14.

The chronological distance T between the signals 7 and 14 and the amplitude A of the signal 14 shown in FIG. 2 are always constant for given component parameters of the circuit of FIG. 1. The following equations apply: $T=T^*$ and $A=A^*$, where $T^*$ and $A^*$ are set-point values specified by intact components. If there should be a defect in a component of the circuit of FIG. 1, then the values of T and/or A change; that is, the measured actual values T and/or A no longer match the specified set-point values $T^*$ and $A^*$. A display of the defect is brought about by an actual-value/set-point comparison in the evaluation unit 6. To this end, the evaluation unit 6 preferably includes a memory 28 for the set-point value, a comparator 30 for the actual-value/set-point comparison, and a display device 32 for both the incoming values and the difference between the set-point and actual values, or in other words the difference $(A^*-A)$ and/or $(T^*-T)$. An alarm device 35 may also be provided.

The two parallel time gate circuits 19A and 19B that precede the evaluation unit 6, intermittently block the input thereof. The first time gate circuit 19A opens within the range of time in which the reflected signals 8 appear. This is represented by the curve 15. The second time gate circuit 19B opens in the range of time in which the delayed and damped signal 14 appears. This is represented by the curve 16. In this way, other reflected signals that follow the reflected signal 8 are blocked out.

The natural frequency of the piezoelectric oscillator 11 is preferably within the natural frequency range of the electrodynamic converter 2.

If the monitoring is to be performed only during pauses in measurement by the measuring system, then it is possible for the piezoelectric oscillator 11 to be switched on only during these times.

Instead of the ultrasonic delay line 11, 12 which is shown, an electromagnetic delay line can also be provided, which is formed of known T or $\pi$ elements. In this case the delayed and damped signal is generated by reflection of the transmission pulse at the open or short-circuited end of the electromagnetic delay line. If the electromagnetic delay line is formed of series-connected inductive resistors and shunt capacitors, then the damping of the signal is effected by the linear resistance of the series-connected inductive resistors, so that the damping resistors 9, 10 can be omitted.

We claim:

1. Monitoring system monitoring electrical components of an apparatus for electrodynamic wall-thickness and defect testing, comprising a transmitter generating brief signals, an electrodynamic converter having a transmitter coil connected to said transmitter for receiving the brief signals and feeding the brief signals into a workpiece to be tested in which the brief signals are reflected, said electrodynamic converter having a receiver coil receiving the reflected signals, an amplifier connected to said receiver coil for receiving the reflected signals, an evaluation unit connected to said amplifier for receiving the reflected signals, and at least one damping element and a delay line connected to said transmitter for delaying and damping the brief signals, said delay line being coupled through said electrodynamic converter to said evaluation unit so as to feed the delayed and damped signals into the transmitter coil of said electrodynamic converter.

2. Monitoring system according to claim 1, wherein said delay line is an ultrasonic delay line.

3. Monitoring system according to claim 1, wherein said delay line is an electromagnetic delay line.

4. Monitoring system according to claim 2, wherein said ultrasonic delay line has at least one piezoelectric converter and a sound conductor connected to said converter.

5. Monitoring system according to claim 4, wherein the signals in said sound conductor are reflected back to said converter.

6. Monitoring system according to claim 4, wherein the natural frequencies of said piezoelectric converter and of said electrodynamic converter are substantially identical.

7. Monitoring system according to claim 2, wherein said ultrasonic delay line has at least one magnetostrictive converter and a sound conductor connected to said converter.

8. Monitoring system according to claim 7, wherein the signals in said sound conductor are reflected back to said converter.

9. Monitoring system according to claim 7, wherein the natural frequencies of said magnetostrictive converter and of said electrodynamic converter are substantially identical.

10. Monitoring system according to claim 1, wherein said at least one damping element includes at least one resistor connected upstream of said delay line.

11. Monitoring system according to claim 1, including at least one time gate circuit connected to said evaluation unit and opening upon the appearance of the reflected signal and upon the appearance of the delayed signal.

12. Monitoring system according to claim 1, including two time gate circuits connected to said evaluation unit, one of said time gate circuits opening upon the appearance of the reflected signal and the other of said time gate circuits opening upon the appearance of the delayed signal.

13. Monitoring system according to claim 1, including two time gate circuits connected to said evaluation unit, said evaluation unit including a memory, a comparator and a display device.

* * * * *